(12) United States Patent
Aggarwal et al.

(10) Patent No.: US 6,249,525 B1
(45) Date of Patent: Jun. 19, 2001

(54) METHOD OF AND APPARATUS FOR INSERTING AND/OR DELETING ESCAPE CHARACTERS INTO AND FROM DATA PACKETS AND DATAGRAMS THEREFOR ON HIGH SPEED DATA STREAM NETWORKING LINES

(75) Inventors: Vijay Aggarwal, Marlborough; Gilbert R. Miller, Uxbridge, both of MA (US)

(73) Assignee: Nexabit Networks, Inc., Marlboro, MA (US)

( * ) Notice: Subject to any disclaimer, the term of this patent is extended or adjusted under 35 U.S.C. 154(b) by 0 days.

(21) Appl. No.: 09/049,564

(22) Filed: Mar. 27, 1998

(51) Int. Cl.[7] .............................. H04L 12/28; H04L 12/56
(52) U.S. Cl. .............................................................. 370/413
(58) Field of Search ..................................... 370/464, 465, 370/474, 476, 412–418, 428, 429, 503, 505, 528, 535, 305, 304; 375/369, 354

(56) References Cited

U.S. PATENT DOCUMENTS

| | | | | |
|---|---|---|---|---|
| 5,307,355 | * | 4/1994 | Lauck et al. | 714/819 |
| 5,638,370 | * | 6/1997 | Seconi et al. | 370/466 |
| 5,671,223 | * | 9/1997 | Shachar et al. | 370/395 |
| 6,034,957 | * | 3/2000 | Haddock et al. | 270/392 |

* cited by examiner

Primary Examiner—Ajit Patel
(74) Attorney, Agent, or Firm—Rines and Rines

(57) ABSTRACT

A technique for encoding (and decoding) escape and other characters in data packets at high rates of speed in HDLC and similar data processing through the use of groups of FIFO data streams parallely fed to and from a multilane highway matrix of input data and escape character switched busses and at relatively low clocking speeds, while running multiple byte streams at a time.

44 Claims, 7 Drawing Sheets

METHOD OF AND APPARATUS FOR INSERTING AND/OR DELETING ESCAPE CHARACTERS INTO AND FROM DATA PACKETS AND DATAGRAMS THEREFOR ON HIGH SPEED DATA STREAM NETWORKING LINES

The present invention relates to networking systems and to the encoding of datagrams therein and to HDLC (high data link control) and similar packet data processing, being more particularly concerned with the problems of appending cyclical redundancy check characters and the insertion and/or deleting of escape characters on serial data links at high data rates or speeds.

BACKGROUND

Special characters termed flags, may be used to define the points where datagrams are to start and end in transmitted and received data streams.

The methodology of the standard in most common protocols is called the above-mentioned HDLC, defining such flags by a special character called 7e. If the character 7e is part of a received datagram, however, the receiver would not know how to distinguish such a flag within a packet and therefore may erroneously interpret the packet as actually two separate packets on either side thereof. The HDLC protocol, therefore, suggests that if the flag character 7e is within the packet stream, an escape character 7d be inserted and appended with the flag character 7e. In the event, moreover, that the letter 7d is already itself inside the packet stream, a further escape character 7b must be inserted to append with 7d.

On the data transmission end, a capability is provided for thus inserting escape characters for special ACCM (Asynchronous Control Character Map) bytes and/or inter-flag bytes in the data stream. Currently this is achieved on a traditional byte-by-byte basis because at high speeds, the time required to do HDLC functions gets very small. A byte time for an OC48 wire, for example, is 3 nanoseconds making comparing and inserting very difficult. The problems with such mechanisms in encoding these escape characters at the transmitter and in detecting these escape characters in reception at very high speeds has been challenging, if not almost impossible, using this current one byte at a time processing technique. Such can allow data streams up to about 100–200 megabits but beyond that it runs short of time in order to process the escape characters as in the inserting and/or deleting of escape characters, on packets that flow at very, very high speeds well beyond the normal OC12, OC48, OC192 respective 0.622 gigabit, 2.4 gigabit or 10 gigabit rates. The prior art actually uses serial streams of data, converting them into bytes and then operating one byte at a time, providing only an advantage factor of $\frac{1}{8}^{th}$ of the wire speed. If the wire speed is at 1 gigahertz, for example, running at $\frac{1}{8}$ the clock is 125 megahertz, and trying to add or delete data at 125 megahertz is a difficult task. It becomes increasingly difficult to process data at 2 bytes at a time or 3 bytes at a time with such conventional techniques.

The present invention, on the other hand, through operating with the input serial data streams divided into smaller groups of data and applied in a parallel fashion, as later detailed, to a multilane highway of input data highway and escape highway matrix busses, now enables the processing of data for HDLC at a much wider bus—instead of just 8 bits, processing at 64, 128, 256, etc. bits at a time, inserting and/or deleting escape characters.

Having successive smaller data groups fed in parallel, means running N×8 as slow as conventional wire speed. With a wire speed of 10 gigabytes and 8 FIFO's, for example, then the 10 gigabytes are divided by 64—the data being processed at the order of 40–50 megahertz. This makes the HDLC coding much simpler, and the same algorithm can then scale at much higher speeds by increasing the number N.

The novel algorithm technique of the invention, indeed, enables processing multiple bytes in but one clock time, and with the clock rate low compared to the data rate.

OBJECT OF INVENTION

An object of the present invention, accordingly, is to provide a new and improved method of and architectural apparatus for the insertion and/or deletion of escape characters into and from data packets and the like at very high data rates for HDLC and similar data processing.

A further object is to provide such a novel apparatus in which an algorithmic technique is employed that enables processing multiple bytes in individual clock times, as distinguished from present—day byte-by-byte serial data processing—i.e. one byte at a time.

Other and further objects will be explained hereinafter and are more fully delineated in the appended claims.

SUMMARY

In summary, however, from one of its important viewpoints, the invention embraces a method of inserting characters in data packets and datagrams therefor on high speed data stream networking links for clocked HDLC data processing, that comprises, interposing a multilane highway matrix of input data and escape character busses between a plurality of input and corresponding output FIFOs; respectively inputting groups of FIFO serial data parallely to successive input data busses of the highway matrix and outputting corresponding groups of FIFO data from the input FIFO multilane highway busses through corresponding output FIFO selectors; comparing data taken from the multilane highway busses with one of inter frame flag, escape, and preprogrammed stored ACCM characters, accordingly logically to control the output FIFO selectors to append a suitable character between appropriate bytes in the data stream; and operating the HDLC clocking at a rate low compared with the said high speed of the data stream.

Preferred and best mode designs and details are hereinafter described

DRAWINGS

The invention will now be described with reference to the accompanying drawings, FIG. 1 of which is an overall functional block diagram of the HDLC function at the transmitter;

FIG. 2 is a block diagram and switching matrix bus highway diagram for

HDLC functions and ACCM specifications in accordance with the preferred embodiment of the invention;

PREFERRED EMBODIMENT(S) OF INVENTION

Figure 1:
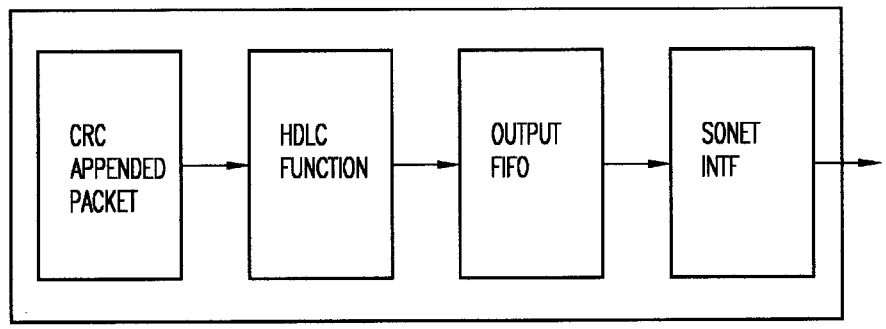

In FIG. 1, a CRC (cylindrical redundancy check) appended data packet is paralleled to n bytes before arriving at the HDLC input interface, providing an output that is also n bytes wide: The HDLC function, therefore, will have to work in a time domain of 'n' times the byte time. As an example, for the case of an OC48 wire, if n is 8, (i.e. processing 8 bytes at a time) then the HDLC function time domain to process 8 bytes would be 8 times 3.3 nsecs or about 25 nsecs. The number n can be calculated to suit hardware requirements mainly a function of wire speed and the technology limits.

Figure 2:
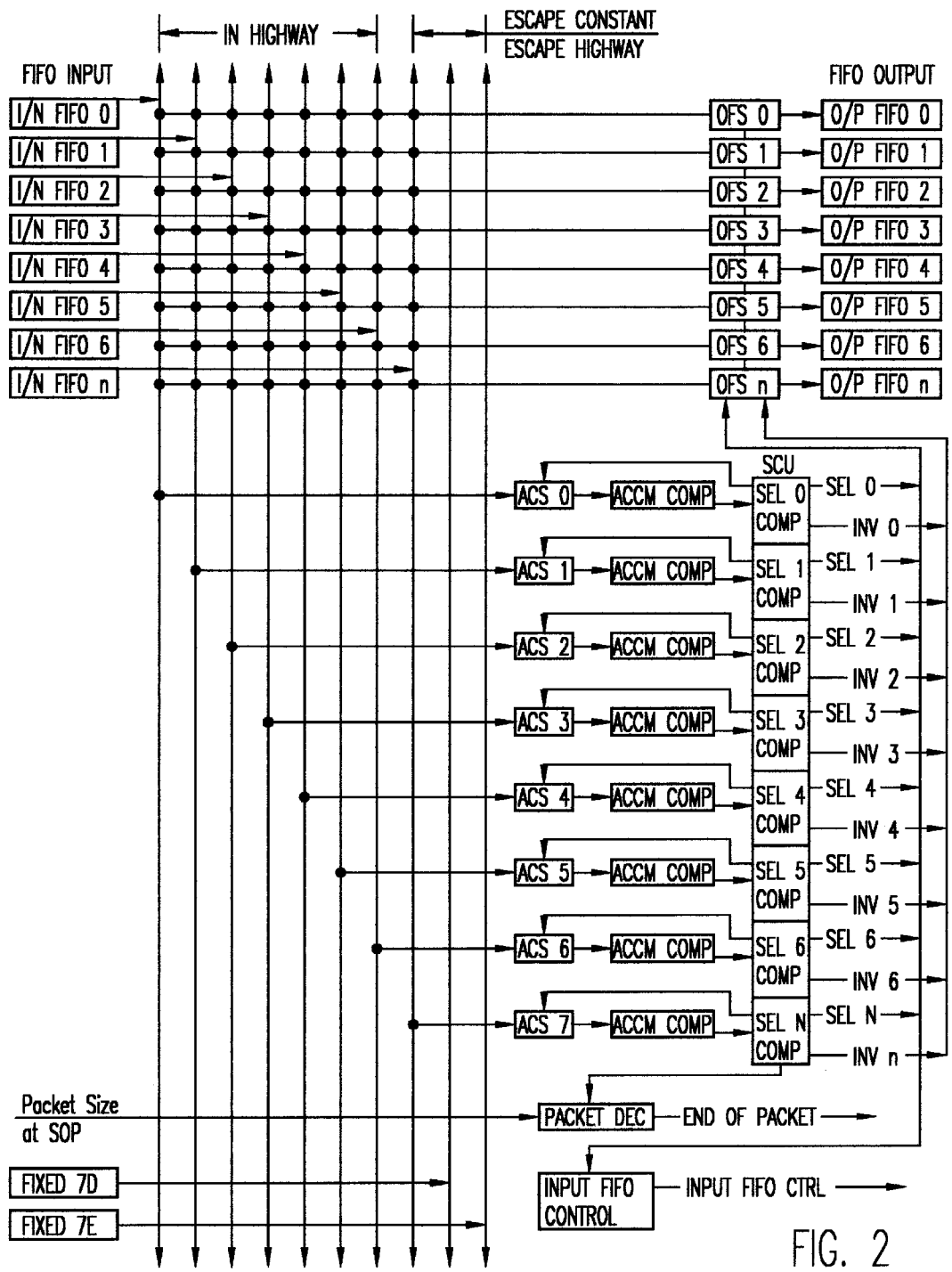

The input side of the HDLC function design assumes n byte streams in an input FIFO divided into groups of serial data at I/N FIFOs 0-n in FIG. 2. The serial data from the FIFOs is then parallely outputted onto corresponding individual I/N data busses of the Multi Lane Highway Matrix. Thus, 1/N FIFO 0 connects with the first vertical I/N data bus from the left; and I/N FIFO n, to the eighth vertical bus, etc. The ultimate concept is to take data out of the Highway busses and compare with either 7e or 7d or some preprogrammed ACCM characters, and then appropriately insert escape characters 7d in the corresponding O/P FIFO 0,1 . . . -n, at the far right in FIG. 2. For every octet of data that is escaped, the $5^{th}$ bit has to be XOR'ed. The comparison of all Input FIFO data is done by compare units ACCM COMP, as selected by ACCM COMPARE SELECTORS, abbreviated to ACS. Each input data highway bus associated with an input FIFO is also connected to a corresponding ACS controlling a corresponding compare unit ACCM COMP (for example, the first bus on the left fed by input FIFO 0 connects to ACS 0, etc.). Data from the ACS is then compared against its ACCM Compare Units, sending a single bit indicating the compare status to a corresponding Select Compute Unit, shown as SEL Comp. (for example, the ACCM COMP of ACS 0 feeds SEL COMP 0, etc.). The Select Computer Units SEL COMP 0, 1, 2 . . . n then control respective output FIFO Selectors (referred to as OFS 0, 1, 2 . . . n), based upon a logic later described, with each selector either taking data from an input FIFO multilane highway bus or from an escape multilane highway bus, FIG. 2, and applying such to the corresponding output FIFO (O/P FIFO). The SEL COMP units also control the input FIFO clocking, as indicated by the feedback lines to the corresponding ACS unit.

More specifically, data in the input FIFO tail enters from the CRC function and then trickles out on the head of the FIFO onto the Input Data Multilane Highway busses, controlled by the Input FIFO Control Block shown in the lower right of FIG. 2. Each of the octet stream groups is an independent FIFO and has its own independent control.

As before stated, data from the Multilane Highway ultimately appears on the input of the output FIFO via corresponding output FIFO selectors OFS that multiplex the Multilane Highway data and apply it on the output FIFOs. Each OFS is controlled, as previously explained, by a corresponding Select Computer Unit SEL COMP that presents its results to meet the selection time and the setup time of the corresponding output FIFO. The output FIFO is an octet FIFO stream that becomes filled by the Multilane Highway via the OFS units and is emptied by the next chip on the stream. When the output FIFO becomes full, such as when the interface is not taking data out, then a FIFO FULL signal will control the clock that runs the right-half of the design, causing the corresponding input FIFO to stall, and causing the data feeder to the input FIFO to block the previous unit.

Each ACS unit (ACCM Control Selectors) selects data from one of the n input FIFO streams and presents it to the corresponding ACCM Compare Unit and is controlled by the corresponding Select Compute Unit SEL COMP. The new selection value will arrive before the end of the clock, accommodating the setup time of a register that registers the next clock selection value.

Figure 3:
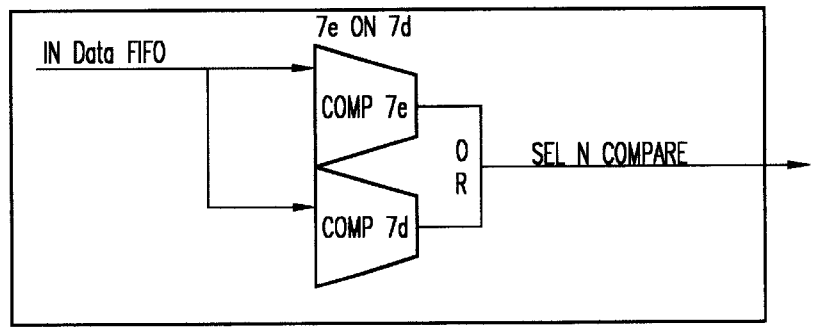
FIG. 3 is a block diagram of the logic ACCM compare units of FIG. 2.

The ACCM Compare Unit, as shown in FIG. 3, will receive input data and compare it against at least two values, 7e and 7d, which are, respectively, the interframe flag and the escape character itself as earlier explained. Such fixed characters 7e and 7d are shown at the bottom left of FIG. 2, respectively connected to first and second Escape Highway busses on the right side of the matrix of busses. In PPP operations, some hosts can also negotiate other characters to be escaped, which can also be included in the list. The result of the compares is OR'ed, FIG. 3, and presented to the corresponding Select Compute Unit, SEL COMP, also referred to as SCU, which mainly controls the corresponding OFS. There are three components of such SCU: Current Select Value, Logic for Next Clock Select Value, and Logic for Current Clock OFS Select Value more fully detailed in FIG. 4.

As previously stated, the SEL COMP or SCU is preceded by an ACCM Comparator which, in turn, is preceded by an ACS. The ACCM Compare Unit is responsible for comparing data from selected Multilane Highway busses with the ACCM characters stored in constant data registers. If the Multilane Highway byte compares with any of the ACCM stored values, it will generate a Compare n Signal, FIG. 3. ACCM-stored values come from a preprogrammed number that a host CPU has requested. These values are bytes that need to be preceded by the escape characters, as earlier explained. The result of the comparison then becomes a part of the COMPARE BUS spanning all SCU units.

Figure 4:
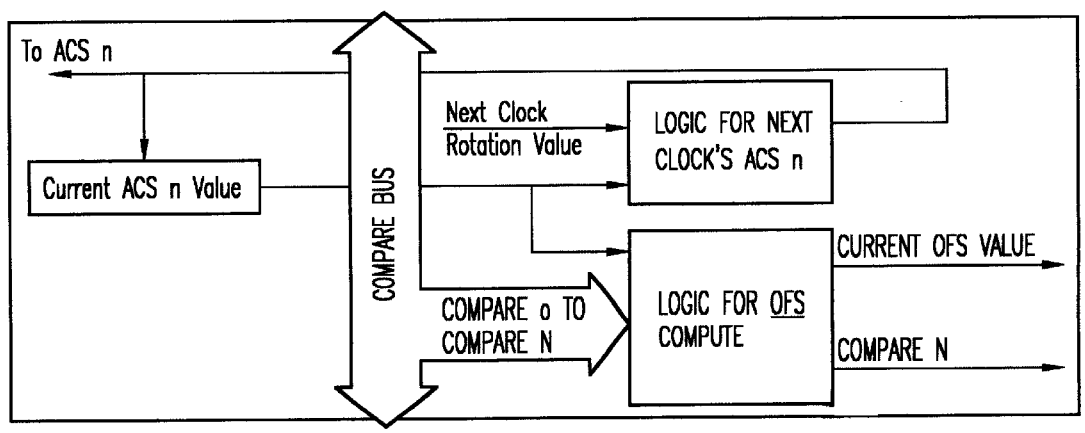
FIG. 4 is a similar diagram of the selector comparator or compute units (SCU) of FIG. 2 that follow the ACCM comparators.
Figure 5:
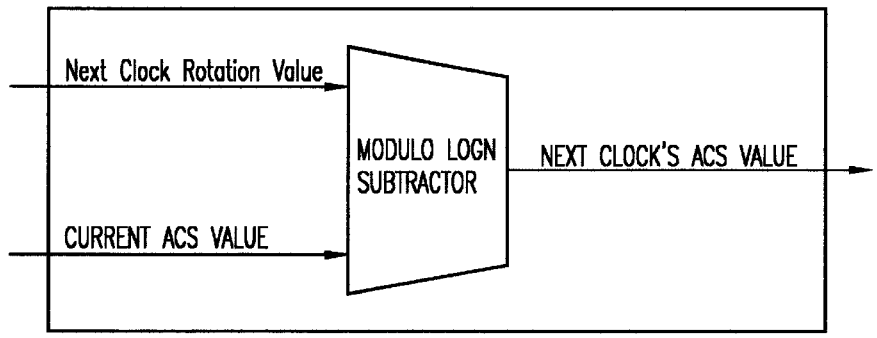
FIG. 5 and FIG. 6 are respectively block diagrams of the logic for the next clock ACS value determination and of the output FIFO selector (OFS) computer logic.

The 'Current ACS n Value' unit of FIG. 4 is a register that holds the value of the Current Clock Select value. On the end of the data packet or start of a new packet, this value is set to 'n', where n is the number of the ACCM, this number being modified before the start of the next clock. This number is used in the algorithm for calculating the 'Current OFS n Value', which is used by the OFS at the end of the current clock. The 'Next Clock ACS n' unit is responsible for generating the value of the next clock ACS; the logic details being shown in FIG. 5. The unit has two inputs: first, a 'Current ACS n Value' and the second, a 'Next Clock Rotation Value' which is generated by the last SCU block: the logic simply does a modulo n subtraction of the 'Next Clock Rotation Value' from the 'Previous Select n Value'. If, for example, the 'Current ACS Value' of Select is 4, and there are 2 compares on the bus, then the next value would be 2. As another example, if the 'Current ACS Value' is 0 and the 'Next Clock Rotation Value' is 2, then the next value would be n-2. The value of this unit is made ready before the setup time of the register in 'Previous Select n Value'. On a functional level, what this unit does is to rotate the OFS counterclockwise by the total number of compares in the previous clock. If, as a further illustration, there are 3 compares during a cycle, then only n-3 bytes are going to be pulled out of the input FIFO. During the next clock, therefore, all the output FIFO selectors will have to rotate 3 bytes in the counterclockwise direction. This value is also fed back to the ACCM Selectors, as before stated, since they then have to examine the correct input FIFO byte for comparing.

Figure 6:
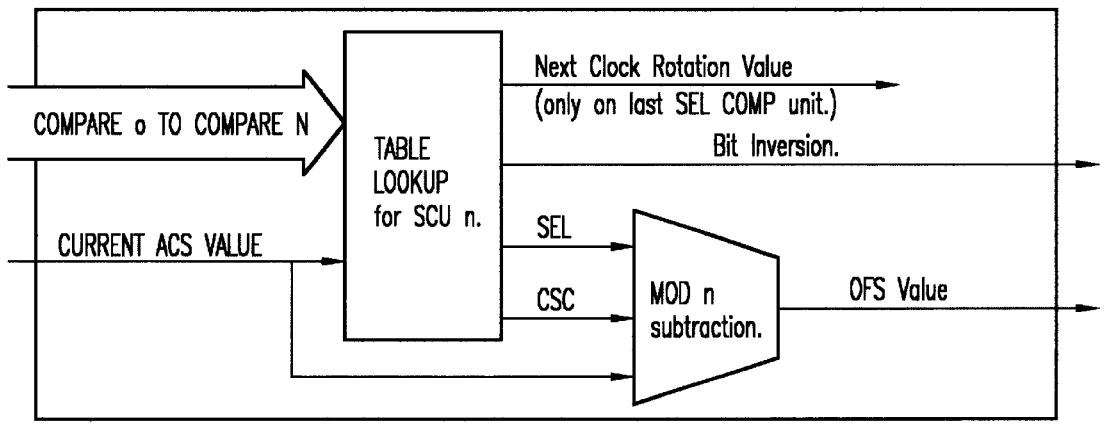

'Current Clock Select n' Unit' is responsible for generating two outputs; an 'OFS Value' and a 'Bit Inversion Indicator', indicated as SEL 0-n and INV 0-n at the right of each SCU or SEL COMP unit in FIG. 2. The last SCU (SEL N COMP) also generates the 'Next Clock Rotation Value'. An upper level block diagram is shown in FIG. 6. The 'OFS Value' signal is generated in a two stage-block. In the first stage, the 'Current ACS Value' and the previous N Compares are looked up in a table, labeled "TABLE LOOK UP for SCUn". This two-stage unit could be merged into one, but larger tables would be required. On a functional level, what this unit does is either to rotate the Output Selectors (OFS) counterclockwise by the number of compares in the previous n ACCM compares, or, if there is a match, to select an ACCM Constant.

The table lookups in the clock selection mechanism are the "brains" of the system, there being a separate table for each selector. The selectors get more complex as the selector moves downwards. The table has two inputs and three outputs (with some exceptions), and these tables calculate the following for each selector:

What should the output FIFO Selectors (OFS) be for end of current clock period;

Any escape character selection for the current selector;

If the current output FIFO should invert the 5$^{th}$ bit of the input octet; and Next Clock ACCM Selection subtraction value (only on the last Selector Calculation Table).

Each table lookup gets two inputs: first, the value of the compares from all ACCM Compare Units; and second, the previous ACCM selector value used in the previous cycle.

Based on the input and output above, exemplary table values for multiple selectors are now presented. For sake of simplicity of explanation, an illustrative case is chosen of selectors 0 1 2 3 5 7.

TABLE 1

Selector 0 Table Lookup

| Current ACCM Compare result | Prev ACCM Select Value | Previous Bit Inversion | Selector Subtraction Value | Output FIFO Bit Inversion |
|---|---|---|---|---|
| xxxx xxx0 | x | y | 0 | y |
| xxx xxx1 | x | y | Esc | y |

TABLE 2

Selector 1 Table Lookup

| Current ACCM Compare result | Prev ACCM Select Value | Selector Subtraction Value | Output FIFO Bit Inversion |
|---|---|---|---|
| xxxx xx00 | x | 0 | 0 |
| xxxx xx01 | x | 1 | 1 |
| xxxx xx10 | x | Esc | 0 |
| xxxx xx11 | x | 1 | 1 |

TABLE 3

Selector 2 Table Lookup

| Current ACCM Compare result | Prev ACCM Select Value | Selector Subtraction Value | Output FIFO Bit Inversion |
|---|---|---|---|
| xxxx x000 | x | 0 | 0 |
| xxxx x001 | x | 1 | 0 |
| xxxx x010 | x | 1 | 1 |
| xxxx x011 | x | Esc | 0 |
| xxxx x100 | x | Esc | 0 |
| xxxx x101 | x | 1 | 0 |
| xxxx x110 | x | 1 | 1 |
| xxxx x111 | x | Esc | 0 |

TABLE 4

Selector 3 Table Lookup

| Current ACCM Compare result | Prev ACCM Select Value | Selector Subtraction Value | Output FIFO Bit Inversion |
|---|---|---|---|
| xxxx 0000 | x | 0 | 0 |
| xxxx 0001 | x | 1 | 0 |
| xxxx 0010 | x | 1 | 0 |
| xxxx 0011 | x | 2 | 1 |
| xxxx 0100 | x | 1 | 1 |
| xxxx 0101 | x | Esc | 0 |
| xxxx 0110 | x | Esc | 0 |
| xxxx 0111 | x | 2 | 1 |
| xxxx 1000 | x | Esc | 0 |
| xxxx 1001 | x | 1 | 0 |
| xxxx 1010 | x | 1 | 0 |
| xxxx 1011 | x | 2 | 1 |
| xxxx 1100 | x | 1 | 1 |
| xxxx 1101 | x | Esc | 0 |
| xxxx 1110 | x | Esc | 0 |
| xxxx 1111 | x | 2 | 1 |

TABLE 5

Selector 5 Table Lookup

| Current ACCM Compare result | Prev ACCM Select Value | Selector Subtraction Value | Output FIFO Bit Inversion |
|---|---|---|---|
| xx00 0000 | x | 0 | 0 |
| xx00 0001 | x | 1 | 0 |
| xx00 0010 | x | 1 | 0 |
| xx00 0011 | x | 2 | 0 |
| xx00 0100 | x | 1 | 0 |
| xx00 0101 | x | 2 | 0 |
| xx00 0110 | x | 2 | 0 |
| xx00 0111 | x | 3 | 1 |
| xx00 1000 | x | 1 | 0 |
| xx00 1001 | x | 2 | 1 |
| xx00 1010 | x | 2 | 1 |

TABLE 5-continued

Selector 5 Table Lookup

| Current ACCM Compare result | Prev ACCM Select Value | Selector Subtraction Value | Output FIFO Bit Inversion |
|---|---|---|---|
| xx00 1011 | x | Esc | 0 |
| xx00 1100 | x | 2 | 1 |
| xx00 1101 | x | Esc | 0 |
| xx00 1110 | x | Esc | 0 |
| xx00 1111 | x | 3 | 1 |
| xx01 0000 | x | 1 | 1 |
| xx01 0001 | x | 2 | 1 |
| xx01 0010 | x | 2 | 1 |
| xx01 0011 | x | 3 | 1 |
| xx01 0100 | x | 2 | 1 |
| xx01 0101 | x | 3 | 1 |
| xx01 0110 | x | 2 | 0 |
| xx01 0111 | x | 3 | 1 |
| xx01 1000 | x | Esc | 0 |
| xx01 1001 | x | 2 | 1 |
| xx01 1010 | x | 2 | 1 |
| xx01 1011 | x | Esc | 0 |
| xx01 1100 | x | 2 | 1 |
| xx01 1101 | x | Esc | 0 |
| xx01 1110 | x | Esc | 0 |
| xx01 1111 | x | 3 | 1 |
| xx10 0000 | x | Esc | 0 |
| xx10 0001 | x | 1 | 0 |
| xx10 0010 | x | 1 | 0 |
| xx10 0011 | x | 2 | 0 |
| xx10 0100 | x | 1 | 0 |
| xx10 0101 | x | 2 | 0 |
| xx10 0110 | x | 2 | 0 |
| xx10 0111 | x | 3 | 1 |
| xx10 1000 | x | 1 | 0 |
| xx10 1001 | x | 2 | 1 |
| xx10 1010 | x | 2 | 1 |
| xx10 1011 | x | Esc | 0 |
| xx10 1100 | x | 2 | 1 |
| xx10 1101 | x | Esc | 0 |
| xx10 1110 | x | Esc | 0 |
| xx10 1111 | x | 3 | 1 |
| xx11 0000 | x | 1 | 1 |
| xx11 0001 | x | 2 | 1 |
| xx11 0010 | x | 2 | 1 |
| xx11 0011 | x | 3 | 1 |
| xx11 0100 | x | 2 | 1 |
| xx11 0101 | x | 3 | 1 |
| xx11 0110 | x | 2 | 0 |
| xx11 0111 | x | 3 | 1 |
| xx11 1000 | x | Esc | 0 |
| xx11 1001 | x | 2 | 1 |
| xx11 1010 | x | 2 | 1 |
| xx11 1011 | x | Esc | 0 |
| xx11 1100 | x | 2 | 1 |
| xx11 1101 | x | Esc | 0 |
| xx11 1110 | x | Esc | 0 |
| xx11 1111 | x | 3 | 1 |

TABLE 6

Selector 7 Table Lookup

| Current ACCM Compare result | Prev ACCM Select Value | Selector Subtraction Value | Output FIFO Bit Inversion | Next Clock Sel Subtraction | Next Clock Inversion |
|---|---|---|---|---|---|
| 0000 0000 | x | 0 | 0 | 0 | 0 |
| 0000 0001 | x | 1 | 0 | 1 | 0 |
| 0000 0010 | x | 1 | 0 | 1 | 0 |
| 0000 0011 | x | 2 | 0 | 2 | 0 |
| 0000 0100 | x | 1 | 0 | 1 | 0 |
| 0000 0101 | x | 2 | 0 | 2 | 0 |
| 0000 0110 | x | 2 | 0 | 2 | 0 |
| 0000 0111 | x | 3 | 0 | 3 | 0 |
| 0000 1000 | x | 1 | 0 | 1 | 0 |
| 0000 1001 | x | 2 | 0 | 2 | 0 |
| 0000 1010 | x | 2 | 0 | 2 | 0 |
| 0000 1011 | x | 3 | 0 | 3 | 0 |
| 0000 1100 | x | 2 | 0 | 2 | 0 |
| 0000 1101 | x | 3 | 0 | 3 | 0 |
| 0000 1110 | x | 3 | 0 | 3 | 0 |
| 0000 1111 | x | 4 | 1 | 4 | 0 |
| 0001 0000 | x | 1 | 0 | 1 | 0 |
| 0001 0001 | x | 2 | 0 | 2 | 0 |
| 0001 0010 | x | 2 | 0 | 2 | 0 |
| 0001 0011 | x | 3 | 0 | 3 | 0 |
| 0001 0100 | x | 2 | 0 | 2 | 0 |
| 0001 0101 | x | 3 | 0 | 3 | 0 |
| 0001 0110 | x | 3 | 1 | 3 | 0 |

TABLE 6-continued

Selector 7 Table Lookup

| Current ACCM Compare result | Prev ACCM Select Value | Selector Subtraction Value | Output FIFO Bit Inversion | Next Clock Sel Subtraction | Next Clock Inversion |
|---|---|---|---|---|---|
| 0001 0111 | x | Esc | 0 | 4 | 1 |
| 0001 1000 | x | 2 | 0 | 2 | 0 |
| 0001 1001 | x | 3 | 1 | 3 | 0 |
| 0001 1010 | x | 3 | 1 | 3 | 0 |
| 0001 1011 | x | Esc | 0 | 3 | 1 |
| 0001 1100 | x | 3 | 1 | 3 | 0 |
| 0001 1101 | x | Esc | 0 | 3 | 1 |
| 0001 1110 | x | Esc | 0 | 3 | 1 |
| 0001 1111 | x | 4 | 1 | 4 | 0 |
| 0010 0000 | x | 1 | 0 | 1 | 0 |
| 0010 0001 | x | 2 | 0 | 2 | 0 |
| 0010 0010 | x | 2 | 0 | 2 | 0 |
| 0010 0011 | x | 3 | 0 | 3 | 0 |
| 0010 0100 | x | 2 | 0 | 2 | 0 |
| 0010 0101 | x | 3 | 0 | 3 | 0 |
| 0010 0110 | x | 3 | 0 | 3 | 0 |
| 0010 0111 | x | 3 | 0 | 3 | 0 |
| 0010 1000 | x | 2 | 0 | 2 | 0 |
| 0010 1001 | x | Esc | 0 | 2 | 1 |
| 0010 1010 | x | Esc | 0 | 2 | 1 |
| 0010 1011 | x | 3 | 0 | 3 | 0 |
| 0010 1100 | x | Esc | 0 | 2 | 1 |
| 0010 1101 | x | Esc | 0 | 3 | 1 |
| 0010 1110 | x | Esc | 0 | 3 | 1 |
| 0010 1111 | x | 4 | 1 | 4 | 0 |
| 0011 0000 | x | 2 | 1 | 2 | 0 |
| 0011 0001 | x | Esc | 0 | 2 | 1 |
| 0011 0010 | x | 3 | 1 | 3 | 0 |
| 0011 0011 | x | 3 | 1 | 3 | 0 |
| 0011 0100 | x | Esc | 0 | 2 | 1 |
| 0011 0101 | x | 3 | 1 | 3 | 0 |
| 0011 0110 | x | 3 | 1 | 3 | 0 |
| 0011 0111 | x | Esc | 0 | 3 | 1 |
| 0011 1000 | x | Esc | 0 | 2 | 1 |
| 0011 1001 | x | 3 | 1 | 3 | 0 |
| 0011 1010 | x | 3 | 1 | 3 | 0 |
| 0011 1011 | x | Esc | 0 | 3 | 1 |
| 0011 1100 | x | 3 | 1 | 3 | 0 |
| 0011 1101 | x | Esc | 0 | 3 | 1 |
| 0011 1110 | x | Esc | 0 | 3 | 1 |
| 0011 1111 | x | 4 | 1 | 4 | 0 |
| 0100 0000 | x | 1 | 1 | 1 | 0 |
| 0100 0001 | x | Esc | 0 | 1 | 1 |
| 0100 0010 | x | Esc | 0 | 1 | 1 |
| 0100 0011 | x | 2 | 0 | 2 | 0 |
| 0100 0100 | x | Esc | 0 | 1 | 1 |
| 0100 0101 | x | 2 | 0 | 2 | 0 |
| 0100 0110 | x | 2 | 0 | 2 | 0 |
| 0100 0111 | x | 3 | 0 | 3 | 0 |
| 0100 1000 | x | Esc | 0 | 1 | 1 |
| 0100 1001 | x | 2 | 0 | 2 | 0 |
| 0100 1010 | x | 2 | 0 | 2 | 0 |
| 0100 1011 | x | 3 | 0 | 3 | 0 |
| 0100 1100 | x | 2 | 0 | 2 | 0 |
| 0100 1101 | x | 3 | 0 | 3 | 0 |
| 0100 1110 | x | 3 | 0 | 3 | 0 |
| 0100 1111 | x | 4 | 1 | 4 | 0 |
| 0101 0000 | x | Esc | 0 | 1 | 1 |
| 0101 0001 | x | 2 | 0 | 2 | 0 |
| 0101 0010 | x | 2 | 0 | 2 | 0 |
| 0101 0011 | x | 3 | 1 | 3 | 0 |
| 0101 0100 | x | 2 | 0 | 2 | 0 |
| 0101 0101 | x | 3 | 1 | 3 | 0 |
| 0101 0110 | x | 3 | 1 | 3 | 0 |
| 0101 0111 | x | Esc | 0 | 3 | 1 |
| 0101 1000 | x | 2 | 0 | 2 | 0 |
| 0101 1001 | x | 3 | 1 | 3 | 0 |
| 0101 1010 | x | 3 | 1 | 3 | 0 |
| 0101 1011 | x | Esc | 0 | 3 | 1 |
| 0101 1100 | x | 3 | 1 | 3 | 0 |
| 0101 1101 | x | Esc | 0 | 3 | 1 |
| 0101 1110 | x | Esc | 0 | 3 | 1 |
| 0101 1111 | x | 4 | 1 | 4 | 0 |

TABLE 6-continued

Selector 7 Table Lookup

| Current ACCM Compare result | Prev ACCM Select Value | Selector Subtraction Value | Output FIFO Bit Inversion | Next Clock Sel Subtraction | Next Clock Inversion |
|---|---|---|---|---|---|
| 0110 0000 | x | Esc | 0 | 1 | 1 |
| 0110 0001 | x | 2 | 1 | 2 | 0 |
| 0110 0010 | x | 2 | 1 | 2 | 0 |
| 0110 0011 | x | Esc | 0 | 2 | 1 |
| 0110 0100 | x | 2 | 1 | 2 | 0 |
| 0110 0101 | x | Esc | 0 | 2 | 1 |
| 0110 0110 | x | Esc | 0 | 2 | 1 |
| 0110 0111 | x | 3 | 0 | 3 | 0 |
| 0110 1000 | x | 2 | 1 | 2 | 0 |
| 0110 1001 | x | Esc | 0 | 2 | 1 |
| 0110 1010 | x | Esc | 0 | 2 | 1 |
| 0110 1011 | x | 3 | 0 | 3 | 0 |
| 0110 1100 | x | Esc | 0 | 2 | 1 |
| 0110 1101 | x | 3 | 0 | 3 | 0 |
| 0110 1110 | x | 3 | 0 | 3 | 0 |
| 0110 1111 | x | 4 | 1 | 4 | 0 |
| 0111 0000 | x | 2 | 1 | 2 | 0 |
| 0111 0001 | x | Esc | 0 | 2 | 1 |
| 0111 0010 | x | Esc | 0 | 2 | 1 |
| 0111 0011 | x | 3 | 1 | 3 | 0 |
| 0111 0100 | x | Esc | 0 | 2 | 1 |
| 0111 0101 | x | 3 | 1 | 3 | 0 |
| 0111 0110 | x | 3 | 1 | 3 | 0 |
| 0111 0111 | x | Esc | 0 | 3 | 1 |
| 0111 1000 | x | Esc | 0 | 2 | 1 |
| 0111 1001 | x | 3 | 1 | 3 | 0 |
| 0111 1010 | x | 3 | 1 | 3 | 0 |
| 0111 1011 | x | Esc | 0 | 3 | 1 |
| 0111 1100 | x | 3 | 1 | 3 | 0 |
| 0111 1101 | x | Esc | 0 | 3 | 1 |
| 0111 1110 | x | Esc | 0 | 3 | 1 |
| 0111 1111 | x | 4 | 1 | 4 | 0 |
| 1000 0000 | x | Esc | 0 | 1 | 1 |
| 1xxx xxxx | Copy 2-127 | Copy 2-127 | Copy 2-127 | Copy 2-127 | Copy 2-127 |

As earlier implied, there needs to be a control to manage the end of the packet, (designated near the bottom in FIG. 2). The input FIFO's last n byte word may not end up on an n byte boundary. Irrespective of whether it does or does not, however, there could be an unpredictable number of escape characters inserted, throwing off any alignment. This means that an End of Packet Indicator must be generated that tells when the packet has ended and on which byte boundary it has ended.

At the start of the packet, the packet and CRC interface should provide the entire packet length clocked in a register. As the input FIFO is clocked, the packet length is decremented by the number of data bytes pulled from the input FIFO. When the counter value goes to zero, the packet end has been reached, and the selectors can then be restarted to the default value. If there are no more packets to process, then all selectors may point to an interframe gap flag 7e.

While there are many ways of implementing an end of packet detection, a preferred method in the design of the present invention now will be described. Since this is a modulo n design, whenever the packet count is more than the value of the mod, the end of packet detector will generate n signals, one each to the n ACS units. When the signal is active, the designed functions are achieved as described above.

In the last clock, however, when the packet count is less than n, then a decoder selects a group of ACS units which point to the interframe flag constant, and also bypasses the ACCS Compare logic.

Figure 7:
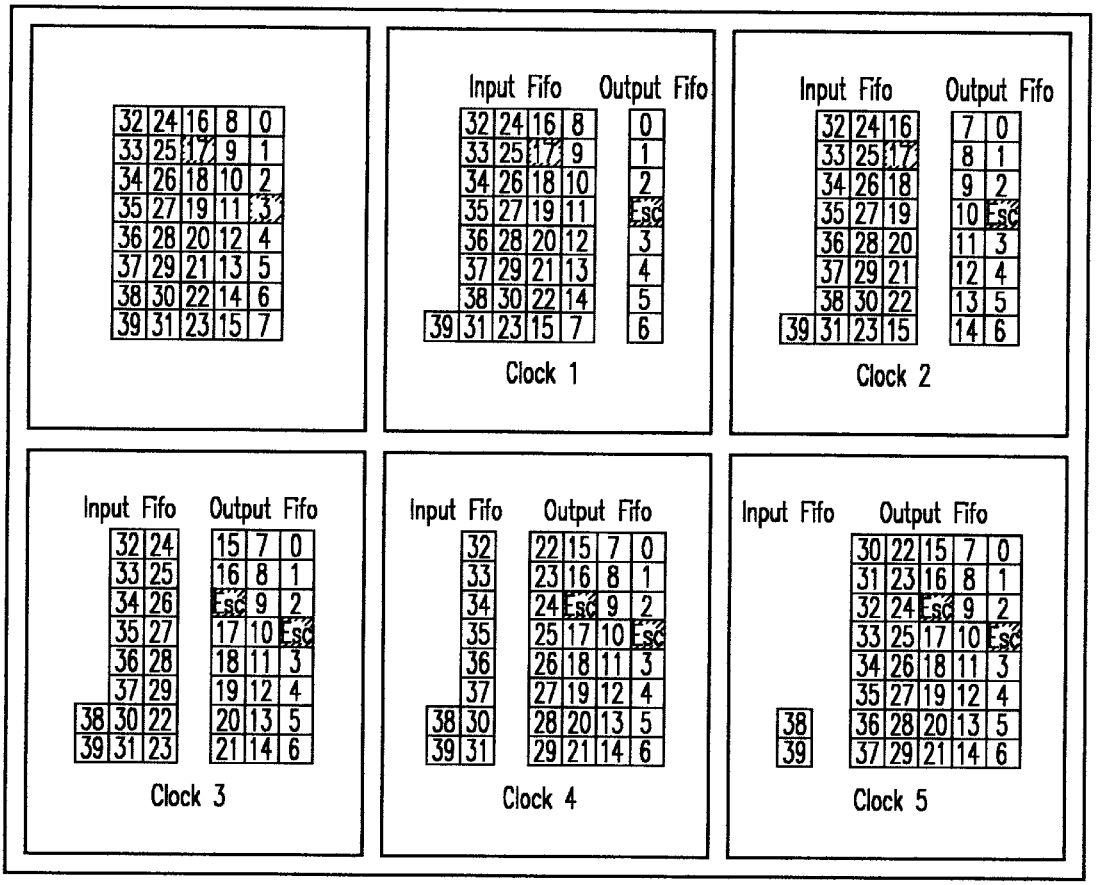
FIG. 7 is an input and output FIFO sequential byte order presentation for successive clock cycles.

It is now in order, accordingly, to explain how, in accordance with the invention, the escape characters are inserted or encoded from an input FIFO stream into the output FIFO stream. This will be demonstrated using the example of FIG. 7. In this case, the input to the FIFO has a forty byte packet and the goal is to insert escape characters in front of, say, bytes 3 and 17, marked in grey. The flow will now be examined on a clock by clock basis.

CLOCK 1

During Clock 1, the ACS aligns such that ACS n points to Multilane Highway n. ACCM Unit 3 will find a match and no other ACCM should find a compare. Each ACCM Compare Unit will then forward the compare result to individual SCUs, which also have the Current ACS value. Each SCU will result in an OFS value. The values will be such that OFS 0 has value 0, OFS 1 has value 1, OFS 2 has value 2, OFS 3 has value of Esc, OFS 4 has value 3 with Invert bit set, OFS 5 has value 4, OFS 6 has value 5, and OFS 7 has value 6.

Since there was just one compare, all ACS will be rotated counterclockwise just one unit. This will leave ACS 0 pointing at 7, ACS 1 pointing at 0, ACS 2 pointing at 1, ACS 3 pointing at 2, ACS 4 pointing at 3, ACS 5 pointing at 4, ACS 6 pointing at 5, and ACS 7 pointing at 6.

The input FIFOs 0 to 6 are thus advanced and FIFO 7 is not advanced. The final image of the FIFOs is shown as Clock 1 in FIG. 7.

CLOCK 2

During Clock 2, the ACS will be aligned as described at the end of Clock 1. During this clock, there will be no compares and all OFS units will maintain the same values, with all ACS units remaining the same. The final image of the FIFOs is shown as Clock 2 in FIG. 7.

CLOCK 3

During Clock 3, the ACS will be aligned as at the end of Clock 1. During Clock 3, ACCM Unit 1 will find a match and no other ACCM should find a compare. Each ACCM Compare Unit will forward the compare result to individual SCUs, which also have the Current ACS value. Each SCU should result in a OFS value. The values should be such that OFS 0 has value 7, OFS 1 has value 0, OFS 2 has value of Esc, OFS 3 has value of 1 with Invert bit set, OFS 4 has value 2, OFS 5 has value 3, OFS 6 has value 4, and OFS 7 has value 5.

Since there was just one compare, all ACS will be rotated counterclockwise one unit. This will leave ACS 0 pointing at 6, ACS 1 pointing at 7, ACS 2 pointing at 0, ACS 3 pointing at 1, ACS 4 pointing at 2, ACS 5 pointing at 3, ACS 6 pointing at 4, and ACS 7 pointing at 5.

The input FIFOs 0 to 6 are thus advanced, and FIFO 7 is not advanced. The final image of the FIFOs is shown as Clock 3 in FIG. 7

CLOCK 4 and CLOCK 5

During Clock 4 and Clock 5, the ACS will be aligned as described at the end of Clock 3, During these clocks, there will be no compares and all OFS will maintain the same values and all ACS will remain the same. The final image of FIFO's is shown as Clock 4 and Clock 5 in FIG. 7.

CLOCK 6

During Clock 6, ACS 0 will select input FIFO 6 and ACS 1 will select FIFO 7; and the subsequent ACS will select Interframe Flag, as the next data.

Figure 8:
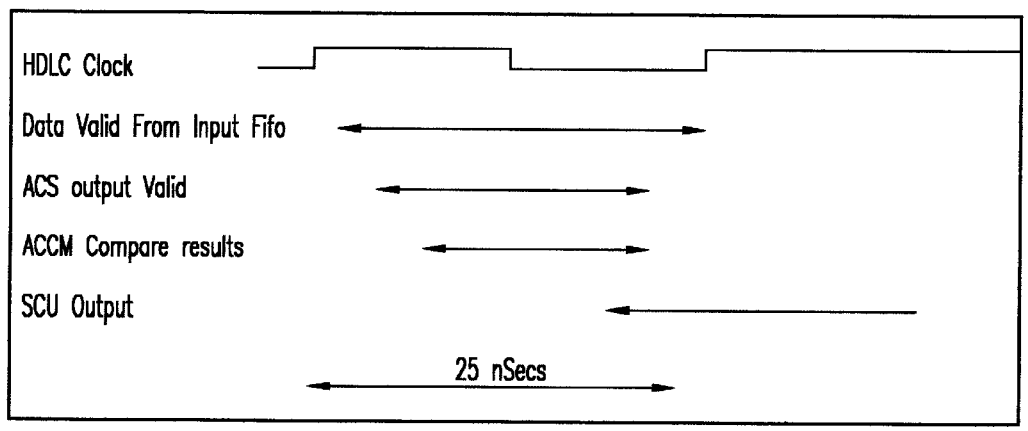
FIG. 8 is a relative timing diagram therefor.

In FIG. 8, the relative timing of the successive HDLC clocking and input data, ACS output and ACCM compare functions is shown over an illustrative 25 n sec. period.

The above description has been concerned with the insertion of escape characters in transmitted data streams. It is now appropriate to consider the detection or decoding of such in receiving the transmitted data streams and performing HDLC processing functions.

Figure 9:
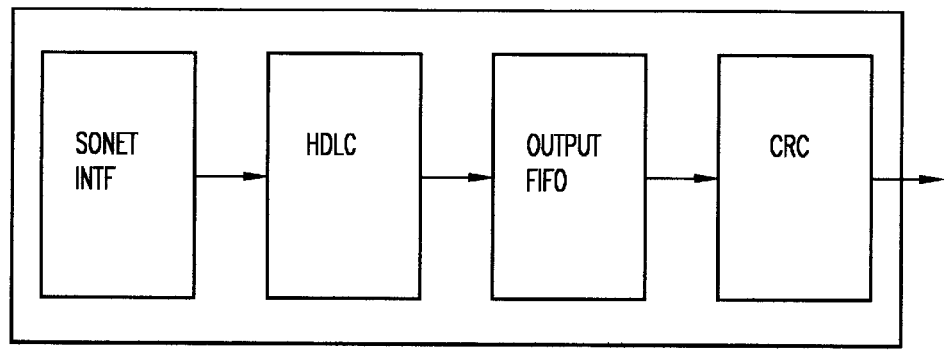
FIG. 9 is an overall receiver HDLC functional block diagram for the transmitter data streams from FIG. 1.

The hardware mechanism used at the receiver for achieving HDLC functions is functionally block diagrammatically illustrated in FIG. 9 in the format similar to that of the transmitting before described in connection with FIG. 1. Serial data bit streams are inputted to the HDLC in most cases from a SONET interface. The output of the HDLC function is a set of FIFOs which are then fed to later-described switch logic. The focus of the design, again, is to illustrate a general mechanism to do HDLC functions at very high speeds.

The HDLC functions assume that a transmitted packet is paralleled to n bytes before it arrives at the HDLC input interface. The HDLC interface will then perform the necessary HDLC functions and provide an output which is also n bytes wide. The HDLC function again will have to work in a time domain of 'n' times the byte time.

Figure 10:
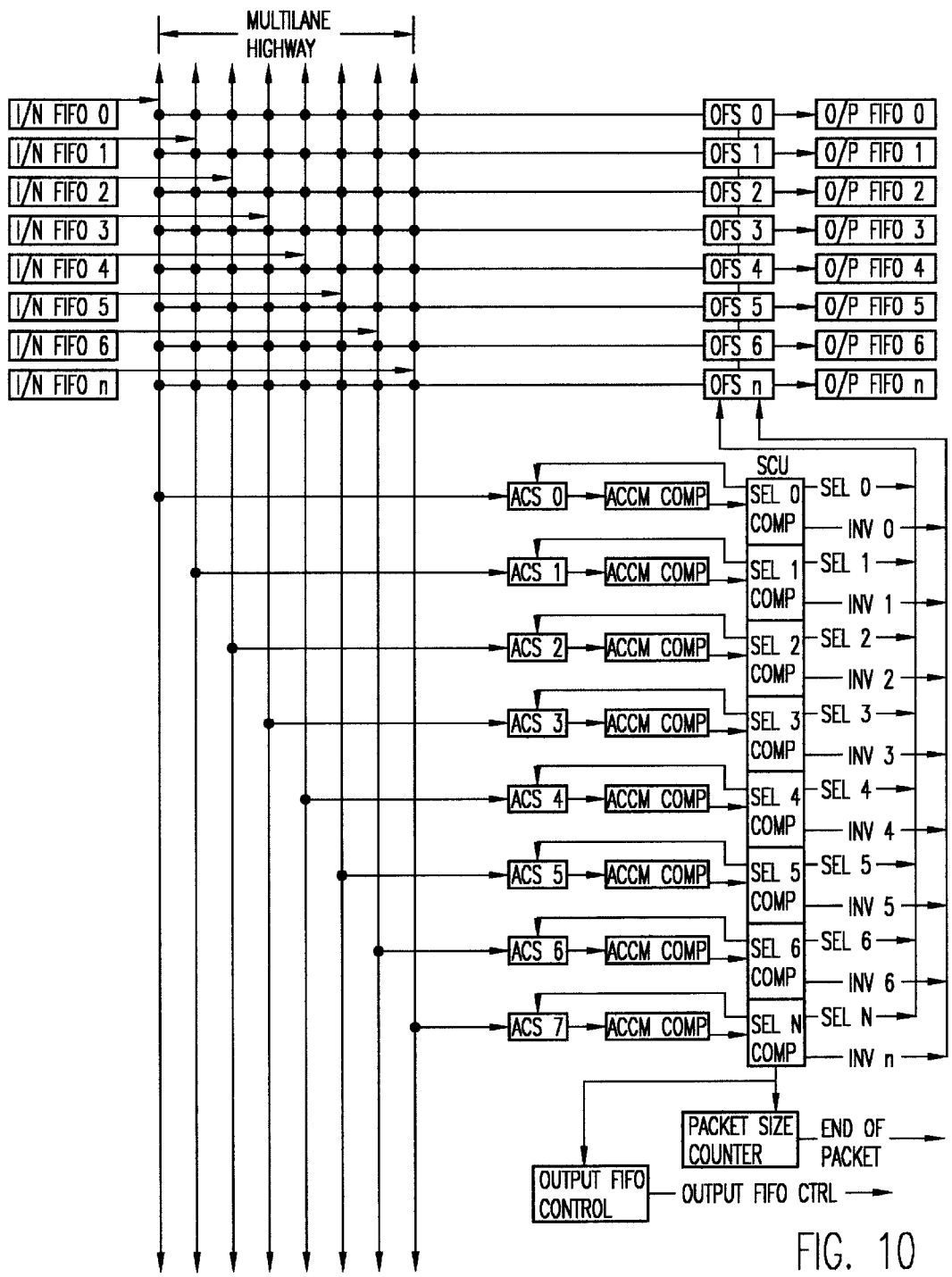
FIG. 10 is a multilane highway bus switching diagram similar to FIG. 2, but for the receiving end.

FIG. 10 represents the received data multilane highway switching matrix HDLC operation, conceptually similar to, but reverse to, the transmitter operation discussed in connection with FIG. 2. Though the concept of FIG. 10 is similar, it operates in a reverse direction. The data stream received from the input FIFO has in it the escape characters and these are to be decoded and removed in the output FIFO and replaced with data—rotating the bytes in the opposite (clockwise) direction to the encoding at the transmitter end.

Again, however, the input side of the design assumes n byte streams in an FIFO input with the data from the FIFOs parallely outputting onto individual busses of a Multi Lane Highway. The ultimate concept is to take data out of the Highway and compare with either 7d or 7e or some programmed ACCM characters. If the data compares with 7d, then the $5^{th}$ bit of the next character should be XOR and inserted in the output FIFO. If the byte is a 7e, then the packet ends at that point. If, on the other hand, the byte is any of the ACCM characters, then the bytes should be deleted. The ACCM Compare Unit input is again selected by 'ACCM COMPARE SELECTORS (ACS). Data from the ACS is then compared against an ACCM Compare Unit List. The result of the compare ends up in the elect Compute Unit (SCU or SEL COMP). The Select Compare or Compute Units then control the output FIFO Selectors (again referred to as OFS) based on the algorithmic logic later outlined. The OFS selectors take data from the input FIFO Multi Lane Highway busses.

The Select Compute Units also control the output FIFO clocking mechanism. In this case, however the input FIFO is always emptied, but the output FIFO may be partially filled and therefore the output FIFO has to be controlled. This is completely opposite to the transmitter operation of FIG. 2. This design has to provide packet delineation control to the next block, which should include packet size, packet start and packet end.

Referring back to FIG. 2, data in the input FIFO tail enters from the parallel serial stream received. The data then trickles out on the head of the FIFO onto the Multilane Highway, controlled by the SCU as previously explained. Whenever data needs to be read from the Multilane Highway, the input FIFO is clocked. Each of the octet stream is an independent FIFO, and the clocking of the input FIFO is controlled by the corresponding Select Compute Unit. The input FIFOs, when full, should set a flag to the incoming unit to stop sending. This flow control mechanism may require a small buffering of data prior to the receive HDLC Unit of FIG. 9.

The data from the Multilane Highway gets clocked into the output FIFOs via the corresponding output FIFO Selectors (OFS) as earlier described, such that the output FIFO serves as a kind of shock absorber for different incoming byte streams that may be clocked differently, and, indeed, should preferably be at least 3 bytes deep. Each of the FIFO Full Flags should be OR, and sent to the SCU, which does the flow control. The Output FIFO Selectors multiplex the Multilane Highway busses onto a single byte output FIFO. The OFS are passive blocks and are completely controlled by the SCU. Similarly, the ACCM Control Selectors, (ACS) multiplexes the Multilane Highway onto a single ACCM Compare Unit, and again are passive blocks that are controlled by the SCU. These ACCM Compare Units compare data from the ACS with constant values stored in registers. As before, there will be at least two values that the incoming data has to be compared with, namely the 7d escape character and the 7e packet delineator. Other values that the data has to be compared with are preprogrammed by a CPU, which are negotiated control characters. If the incoming data has these control characters without the preceding byte not being a 7d, then they have to be deleted from the outgoing stream. The ACU does not make the decision of deleting or XOR of $5^{th}$ bit, but provides the next Select Compare Unit with enough information for it to make the decision. The ACU block diagram is shown in FIG. 11, which serves as an upper level functional block diagram illustrating a suitable algorithmic operational flow as follows:

```
IF (non 7d or 7e Compare)
   IF (Escape from Previous ACU)
      Set XOR Bit
   ELSE
      Set delete bit
   ENDIF
ELSE
   IF (Escape from Previous ACU)
      Set Xor Bit
      Set Error Bit
   ELSE
      Do nothing
   ENDIF
ENDIF
IF (current compare=Escape i.e. 7d)
   Set Delete Bit
ENDIF
IF (selector is pointing to last multilane Highway)
   Do not forward Escape Compare to next ACU
ELSE
   Forward Escape Compare to next ACU.
ENDIF
IF (current compare=Escape i.e. 7e)
   Set EOP Bit.
ENDIF
```

Figure 11:
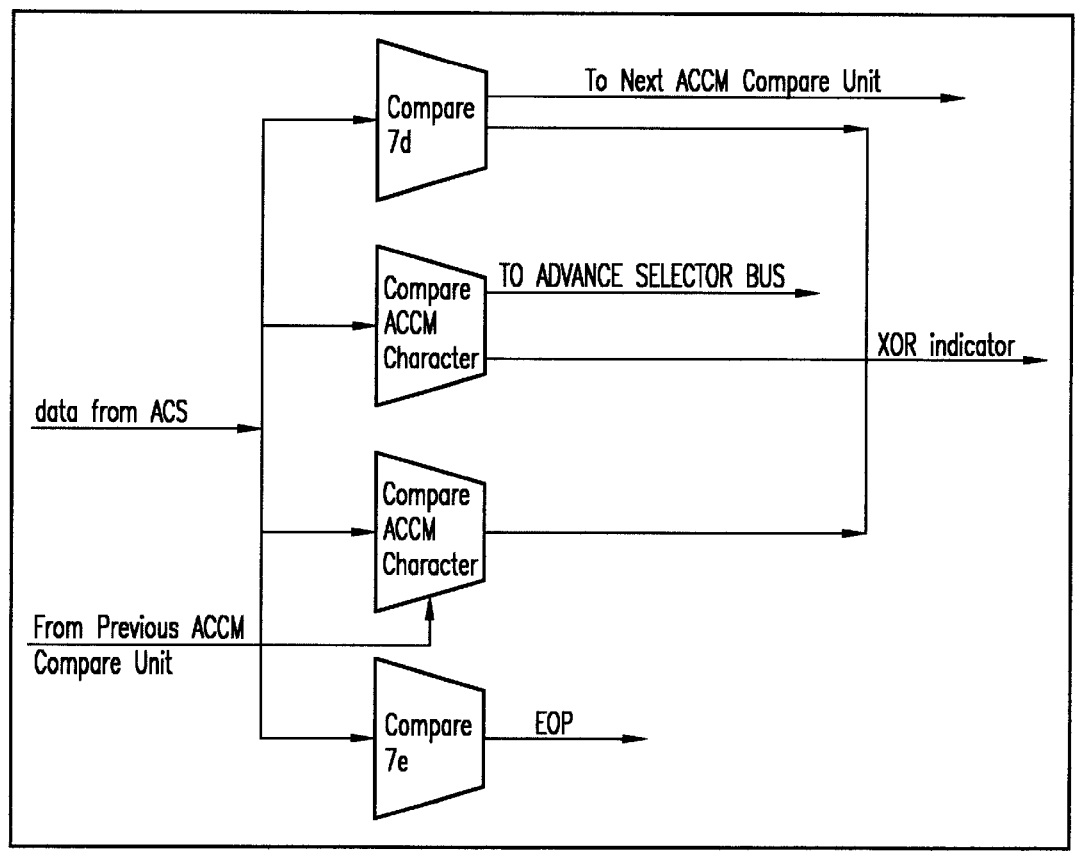
FIG. 11 is a block diagram of the ACCM compare unit of FIG. 10.
Figure 12:
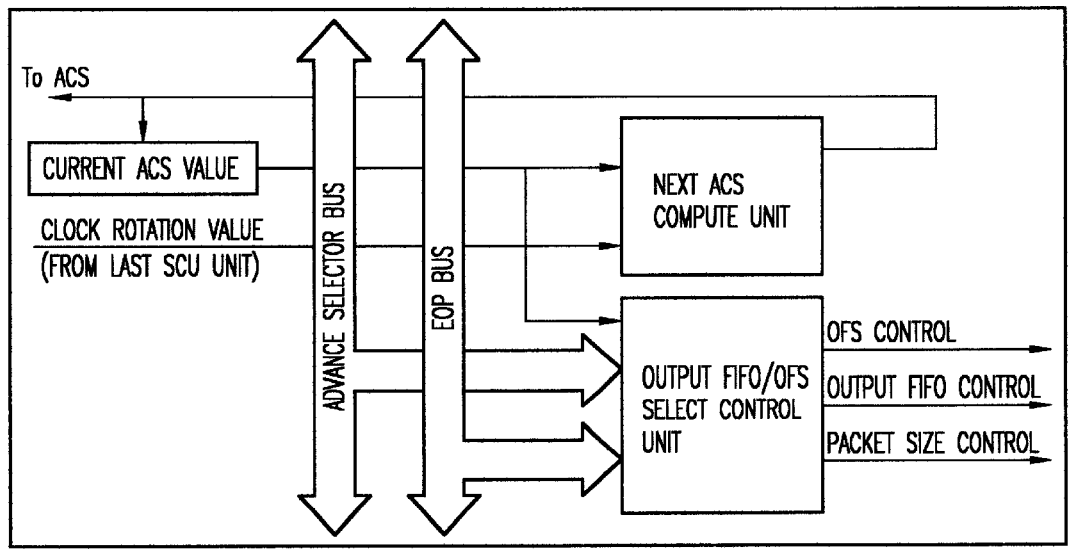
FIG. 12 and FIG. 13 are block diagrams respectively of the select compute unit and the next ACS logic for the system of FIG. 10.
Figure 13:
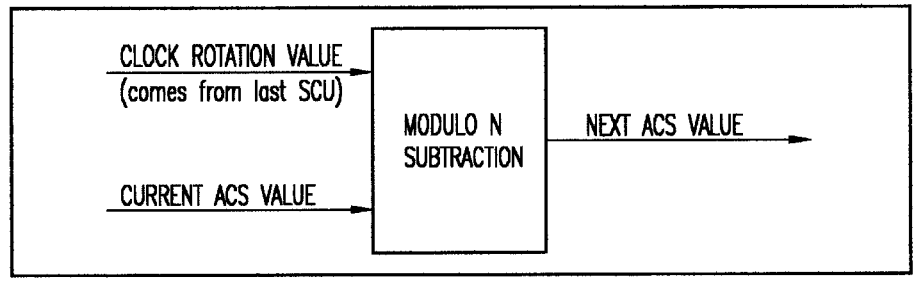
Figure 14:
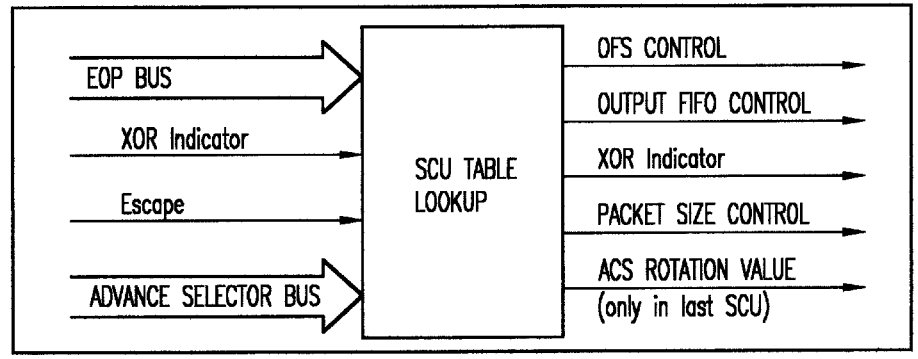
FIG. 14 is a block diagram of the use of a lookup table for the data stream reception and decoding.

The results of the 7d or 7e compare FIG. 11, are fed to the advanced selector bus of FIG. 12 and FIG. 14, feeding the output FIFO control unit OFS Control; and there is another computation unit called the Next ACS Compute Unit, FIG. 12, which calculates the next ACS value. That next ACS value is further shown in FIG. 13 and represents a unit that subtracts the total computation value from the current ACS value—in concept, similar to the earlier description at the transmitter. The FIFO Select Control Unit employs a large table lookup for the functions of FIG. 14. The table lookup for the receiver is identical for all SCU units which, as earlier shown in Tables 1–6, above, is not the same on the transmitter side. The concepts are, however, very similar, where the output FIFO datastream is rotated, FIG. 14, to remove escape characters and to fill them with useful data. An exemplary lookup Table 7 follows:

TABLE 7

| ADVANCEBUS VALUE | CUR SCU 0 VALUE | CUR SCU 1 VALUE | CUR SCU 2 VALUE | CUR SCU 3 VALUE | CUR SCU 4 VALUE | CUR SCU 5 VALUE | CUR SCU 6 VALUE | CUR SCU 7 VALUE | ROT VALUE |
|---|---|---|---|---|---|---|---|---|---|
| 0000 0000 | 0 | 0 | 0 | 0 | 0 | 0 | 0 | 0 | 0 |
| 0000 0001 | 1,xor | 1 | 1 | 1 | 1 | 1 | 1 | — | 1 |
| 0000 0010 | 0 | 1,xor | 1 | 1 | 1 | 1 | 1 | — | 1 |
| 0000 0011 | I11 | 1 | 1 | 1 | 1 | 1 | 1 | — | 1 |
| 0000 0100 | 0 | 0 | 1 | 1 | 1 | 1 | 1 | — | 1 |
| 0000 0101 | 1 | 2 | 2 | 2 | 2 | 2 | — | — | 2 |
| 0000 0110 | 0 | I11 | 1 | 1 | 1 | 1 | 1 | — | 1 |
| 0000 0111 | I11 | 2 | 2 | 2 | 2 | 2 | — | — | 2 |
| 0000 1000 | 0 | 0 | 0 | 1 | 1 | 1 | 1 | — | 1 |
| 0000 1001 | 1 | 1 | 1 | 2 | 2 | 2 | — | — | 2 |
| 0000 1010 | 0 | 1 | 1 | 2 | 2 | 2 | — | — | 2 |
| 0000 1011 | I11 | 1 | 2 | 2 | 2 | 2 | — | — | 2 |
| 0000 1100 | 0 | 0 | I11 | 1 | 1 | 1 | 1 | — | 1 |
| 0000 1101 | 1 | I11 | 2 | 2 | 2 | 2 | — | — | 2 |
| 0000 1110 | 0 | I11 | 2 | 2 | 2 | 2 | — | — | 2 |
| 0000 1111 | I11 | I11 | 2 | 2 | 2 | 2 | — | — | 2 |
| 0001 0000 | 0 | 0 | 0 | 0 | 1 | 1 | 1 | — | 1 |
| 0001 0001 | 1 | 1 | 1 | 2 | 2 | 2 | — | — | 2 |
| 0001 0010 | 0 | 1 | 1 | 2 | 2 | 2 | — | — | 2 |
| 0001 0011 | I11 | 1 | 1 | 2 | 2 | 2 | — | — | 2 |
| 0001 0100 | 0 | 0 | 1 | 2 | 2 | 2 | — | — | 2 |
| 0001 0101 | 1 | 2 | 3 | 3 | 3 | — | — | — | 3 |
| 0001 0110 | 0 | I11 | 1 | 2 | 2 | 2 | — | — | 2 |
| 0001 0111 | I11 | 2 | 3 | 3 | 3 | — | — | — | 3 |
| 0001 1000 | 0 | 0 | 0 | I11 | 1 | 1 | 1 | — | 1 |
| 0001 1001 | 1 | 1 | I11 | 2 | 2 | 2 | — | — | 2 |
| 0001 1010 | 0 | 1 | I11 | 2 | 2 | 2 | — | — | 2 |
| 0001 1011 | I11 | 1 | I11 | 2 | 2 | 2 | — | — | 2 |
| 0001 1100 | 0 | 0 | I11 | 2 | 2 | 2 | — | — | 2 |
| 0001 1101 | 1 | I11 | 3 | 3 | 3 | — | — | — | 3 |
| 0001 1110 | 0 | I11 | I11 | 2 | 2 | 2 | — | — | 2 |
| 0001 1111 | I11 | I11 | 3 | 3 | 3 | — | — | — | 3 |
| 0010 0000 | 0 | 0 | 0 | 0 | 0 | 1 | 1 | — | 1 |
| 0010 0001 | 1 | 1 | 1 | 1 | 2 | 2 | — | — | 2 |
| 0010 0010 | 0 | 1 | 1 | 1 | 2 | 2 | — | — | 2 |
| 0010 0011 | I11 | 1 | 1 | 1 | 2 | 2 | — | — | 2 |
| 0010 0100 | 0 | 0 | 1 | 1 | 2 | 2 | — | — | 2 |
| 0010 0101 | 1 | 2 | 2 | 3 | 3 | — | — | — | 3 |
| 0010 0110 | 0 | I11 | 1 | 1 | 2 | 2 | — | — | 2 |
| 0010 0111 | I11 | 2 | 2 | 3 | 3 | — | — | — | 3 |
| 0010 1000 | 0 | 0 | 0 | 1 | 2 | 2 | — | — | 2 |
| 0010 1001 | 1 | 1 | 1 | 3 | 3 | — | — | — | 3 |
| 0010 1010 | 0 | 1 | 1 | 3 | 3 | — | — | — | 3 |
| 0010 1011 | I11 | 1 | 2 | 3 | 3 | — | — | — | 3 |
| 0010 1100 | 0 | 0 | I11 | 1 | 2 | 2 | — | — | 2 |

TABLE 7-continued

| ADVANCEBUS VALUE | CUR SCU 0 VALUE | CUR SCU 1 VALUE | CUR SCU 2 VALUE | CUR SCU 3 VALUE | CUR SCU 4 VALUE | CUR SCU 5 VALUE | CUR SCU 6 VALUE | CUR SCU 7 VALUE | ROT VALUE |
|---|---|---|---|---|---|---|---|---|---|
| 0010 1101 | 1 | I11 | 2 | 3 | 3 | — | — | — | 3 |
| 0010 1110 | 0 | I11 | 2 | 3 | 3 | — | — | — | 3 |
| 0010 1111 | I11 | I11 | 2 | 3 | 3 | — | — | — | 3 |
| 0011 0000 | 0 | 0 | 0 | 0 | I11 | 1 | 1 | — | 1 |
| 0011 0001 | 1 | 1 | 1 | I11 | 2 | 2 | — | — | 2 |
| 0011 0010 | 0 | 1 | 1 | I11 | 2 | 2 | — | — | 2 |
| 0011 0011 | I11 | 1 | 1 | I11 | 2 | 2 | — | — | 2 |
| 0011 0100 | 0 | 0 | 1 | I11 | 2 | 2 | — | — | 2 |
| 0011 0101 | 1 | 2 | I11 | 3 | 3 | — | — | — | 3 |
| 0011 0110 | 0 | I11 | 1 | I11 | 2 | 2 | — | — | 2 |
| 0011 0111 | I11 | 2 | I11 | 3 | 3 | — | — | — | 3 |
| 0011 1000 | 0 | 0 | 0 | I11 | 2 | 2 | — | — | 2 |
| 0011 1001 | 1 | 1 | I11 | 3 | 3 | — | — | — | 3 |
| 0011 1010 | 0 | 1 | I11 | 3 | 3 | — | — | — | 3 |
| 0011 1011 | I11 | 1 | I11 | 3 | 3 | — | — | — | 3 |
| 0011 1100 | 0 | 0 | I11 | I11 | 2 | 2 | — | — | 2 |
| 0011 1101 | 1 | I11 | I11 | 3 | 3 | — | — | — | 3 |
| 0011 1110 | 0 | I11 | 2 | 3 | 3 | — | — | — | 3 |
| 0011 1111 | I11 | I11 | I11 | I11 | 3 | — | — | — | 3 |
| 0100 0000 | 0 | 0 | 0 | 0 | 0 | 0 | 1 | — | 1 |
| 0100 0001 | 1 | 1 | 1 | 1 | 1 | 2 | — | — | 2 |
| 0100 0010 | 0 | 1 | 1 | 1 | 1 | 2 | — | — | 2 |
| 0100 0011 | I11 | 1 | 1 | 1 | 1 | 2 | — | — | 2 |
| 0100 0100 | 0 | 0 | 1 | 1 | 1 | 2 | — | — | 2 |
| 0100 0101 | 1 | 2 | 2 | 2 | 3 | — | — | — | 3 |
| 0100 0110 | 0 | I11 | 1 | 1 | 1 | 2 | — | — | 2 |
| 0100 0111 | I11 | 2 | 2 | 2 | 3 | — | — | — | 3 |
| 0100 1000 | 0 | 0 | 0 | 1 | 1 | 2 | — | — | 2 |
| 0100 1001 | 1 | 1 | 1 | 2 | 3 | — | — | — | 3 |
| 0100 1010 | 0 | 1 | 1 | 2 | 3 | — | — | — | 3 |
| 0100 1011 | I11 | 1 | 2 | 2 | 3 | — | — | — | 3 |
| 0100 1100 | 0 | 0 | I11 | 1 | 1 | 2 | — | — | 3 |
| 0100 1101 | 1 | I11 | 2 | 2 | 3 | — | — | — | 3 |
| 0100 1110 | 0 | I11 | 2 | 2 | 3 | — | — | — | 3 |
| 0100 1111 | I11 | I11 | 2 | 2 | 3 | — | — | — | 3 |
| 0101 0000 | 0 | 0 | 0 | 0 | 1 | 2 | — | — | 2 |
| 0101 0001 | 1 | 1 | 1 | 2 | 3 | — | — | — | 3 |
| 0101 0010 | 0 | 1 | 1 | 2 | 3 | — | — | — | 3 |
| 0101 0011 | I11 | 1 | 1 | 2 | 3 | — | — | — | 3 |
| 0101 0100 | 0 | 0 | 1 | 2 | 3 | — | — | — | 3 |
| 0101 0101 | 1 | 2 | 3 | 3 | 3 | — | — | — | 3 |
| 0101 0110 | 0 | I11 | 1 | 2 | 3 | — | — | — | 3 |
| 0101 0111 | I11 | 2 | 3 | 4 | — | — | — | — | 4 |
| 0101 1000 | 0 | 0 | 0 | I11 | 1 | 2 | — | — | 2 |
| 0101 1001 | 1 | 1 | I11 | 2 | 3 | — | — | — | 3 |
| 0101 1010 | 0 | 1 | I11 | 2 | 3 | — | — | — | 3 |
| 0101 1011 | I11 | 1 | I11 | 2 | 3 | — | — | — | 3 |
| 0101 1100 | 0 | 0 | I11 | 2 | 3 | — | — | — | 3 |
| 0101 1101 | 1 | I11 | 3 | 4 | — | — | — | — | 4 |
| 0101 1110 | 0 | I11 | I11 | 2 | 3 | — | — | — | 3 |
| 0101 1111 | I11 | I11 | 3 | 4 | — | — | — | — | 4 |
| 0110 0000 | 0 | 0 | 0 | 0 | 0 | I11 | 1 | — | 1 |
| 0110 0001 | 1 | 1 | 1 | 1 | I11 | 2 | — | — | 2 |
| 0110 0010 | 0 | 1 | 1 | 1 | I11 | 2 | — | — | 2 |
| 0110 0011 | I11 | 1 | 1 | 1 | I11 | 2 | — | — | 2 |
| 0110 0100 | 0 | 0 | 1 | 1 | I11 | 2 | — | — | 2 |
| 0110 0101 | 1 | 2 | 2 | I11 | 3 | — | — | — | 3 |
| 0110 0110 | 0 | I11 | 1 | 1 | I11 | 2 | — | — | 2 |
| 0110 0111 | I11 | 2 | 2 | I11 | 3 | — | — | — | 3 |
| 0110 1000 | 0 | 0 | 0 | 1 | I11 | 2 | — | — | 2 |
| 0110 1001 | 1 | 1 | 1 | I11 | 3 | — | — | — | 3 |
| 0110 1010 | 0 | 1 | 1 | I11 | 3 | — | — | — | 3 |
| 0110 1011 | I11 | 1 | 2 | I11 | 3 | — | — | — | 3 |
| 0110 1100 | 0 | 0 | I11 | 1 | I11 | 2 | — | — | 2 |
| 0110 1101 | 1 | I11 | 2 | I11 | 3 | — | — | — | 3 |
| 0110 1110 | 0 | I11 | 2 | I11 | 3 | — | — | — | 3 |
| 0110 1111 | I11 | I11 | 2 | I11 | 3 | — | — | — | 3 |
| 0111 0000 | 0 | 0 | 0 | 0 | I11 | 2 | — | — | 2 |
| 0111 0001 | 1 | 1 | 1 | I11 | 3 | — | — | — | 3 |
| 0111 0010 | 0 | 1 | 1 | I11 | 3 | — | — | — | 3 |
| 0111 0011 | I11 | 1 | 1 | I11 | 3 | — | — | — | 3 |
| 0111 0100 | 0 | 0 | 1 | I11 | 3 | — | — | — | 3 |
| 0111 0101 | 1 | 2 | I11 | I11 | 3 | — | — | — | 3 |
| 0111 0110 | 0 | I11 | 1 | I11 | 3 | — | — | — | 3 |
| 0111 0111 | I11 | 2 | I11 | I11 | 3 | — | — | — | 3 |

TABLE 7-continued

| ADVANCEBUS VALUE | CUR SCU 0 VALUE | CUR SCU 1 VALUE | CUR SCU 2 VALUE | CUR SCU 3 VALUE | CUR SCU 4 VALUE | CUR SCU 5 VALUE | CUR SCU 6 VALUE | CUR SCU 7 VALUE | ROT VALUE |
|---|---|---|---|---|---|---|---|---|---|
| 0111 1000 | 0 | 0 | 0 | I11 | I11 | 2 | — | — | 2 |
| 0111 1001 | 1 | 1 | I11 | I11 | 3 | — | — | — | 3 |
| 0111 1010 | 0 | 1 | I11 | I11 | 3 | — | — | — | 3 |
| 0111 1011 | I11 | 1 | I11 | I11 | 3 | — | — | — | 3 |
| 0111 1100 | 0 | 0 | I11 | I11 | 3 | — | — | — | 3 |
| 0111 1101 | 1 | I11 | I11 | I11 | 3 | — | — | — | 3 |
| 0111 1110 | 0 | I11 | 2 | I11 | 3 | — | — | — | 3 |
| 0111 1111 | I11 | I11 | I11 | I11 | 3 | — | — | — | 3 |
| 1000 0000 | 0 | 0 | 0 | 0 | 0 | 0 | 0 | 1,c | 1 |
| 1000 0001 | 1 | 1 | 1 | 1 | 1 | 1 | 1,c | — | 1 |
| 1000 0010 | 0 | 1 | 1 | 1 | 1 | 1 | 1,c | — | 1 |
| 1000 0011 | I11 | 1 | 1 | 1 | 1 | 1 | 1,c | — | 1 |
| 1000 0100 | 0 | 0 | 1 | 1 | 1 | 1 | 1,c | — | 1 |
| 1000 0101 | 1 | 2 | 2 | 2 | 2 | 2,c | — | — | 2 |
| 1000 0110 | 0 | I11 | 1 | 1 | 1 | 1 | 1,c | — | 1 |
| 1000 0111 | I11 | 2 | 2 | 2 | 2 | 2,c | — | — | 2 |
| 1000 1000 | 0 | 0 | 0 | 1 | 1 | 1 | 1,c | — | 1 |
| 1000 1001 | 1 | 1 | 1 | 2 | 2 | 2,c | — | — | 2 |
| 1000 1010 | 0 | 1 | 1 | 2 | 2 | 2,c | — | — | 2 |
| 1000 1011 | I11 | 1 | 2 | 2 | 2 | 2,c | — | — | 2 |
| 1000 1100 | 0 | 0 | I11 | 1 | 1 | 1 | 1,c, | — | 1 |
| 1000 1101 | 1 | I11 | 2 | 2 | 2 | 2,c | — | — | 2 |
| 1000 1110 | 0 | I11 | 2 | 2 | 2 | 2,c | — | — | 2 |
| 1000 1111 | I11 | I11 | 2 | 2 | 2 | 2,c | — | — | 2 |
| 1001 0000 | 0 | 0 | 0 | 0 | 1 | 1 | 1,c | — | 1 |
| 1001 0001 | 1 | 1 | 1 | 2 | 2 | 2,c | — | — | 2 |
| 1001 0010 | 0 | 1 | 1 | 2 | 2 | 2,c | — | — | 2 |
| 1001 0011 | I11 | 1 | 1 | 2 | 2 | 2,c | — | — | 2 |
| 1001 0100 | 0 | 0 | 1 | 2 | 2 | 2,c | — | — | 2 |
| 1001 0101 | 1 | 2 | 3 | 3 | 3 | — | — | — | 3 |
| 1001 0110 | 0 | I11 | 1 | 2 | 2 | 2,c | — | — | 2 |
| 1001 0111 | I11 | 2 | 3 | 3 | 3 | — | — | — | 3 |
| 1001 1000 | 0 | 0 | 0 | I11 | 1 | 1 | 1,c | — | 1 |
| 1001 1001 | 1 | 1 | I11 | 2 | 2 | 2,c | — | — | 2 |
| 1001 1010 | 0 | 1 | I11 | 2 | 2 | 2,c | — | — | 2 |
| 1001 1011 | I11 | 1 | I11 | 2 | 2 | 2,c | — | — | 2 |
| 1001 1100 | 0 | 0 | I11 | 2 | 2 | 2,c | — | — | 2 |
| 1001 1101 | 1 | I11 | 3 | 3 | 3 | — | — | — | 3 |
| 1001 1110 | 0 | I11 | I11 | 2 | 2 | 2,c | — | — | 2 |
| 1001 1111 | I11 | I11 | 3 | 3 | 3 | — | — | — | 3 |
| 1010 0000 | 0 | 0 | 0 | 0 | 0 | 1 | 1,c | — | 1 |
| 1010 0001 | 1 | 1 | 1 | 1 | 2 | 2,c | — | — | 2 |
| 1010 0010 | 0 | 1 | 1 | 1 | 2 | 2,c | — | — | 2 |
| 1010 0011 | I11 | 1 | 1 | 1 | 2 | 2,c | — | — | 2 |
| 1010 0100 | 0 | 0 | 1 | 1 | 2 | 2,c | — | — | 2 |
| 1010 0101 | 1 | 2 | 2 | 3 | 3 | — | — | — | 3 |
| 1010 0110 | 0 | I11 | 1 | 1 | 2 | 2,c | — | — | 2 |
| 1010 0111 | I11 | 2 | 2 | 3 | 3 | — | — | — | 3 |
| 1010 1000 | 0 | 0 | 0 | 1 | 2 | 2,c | — | — | 2 |
| 1010 1001 | 1 | 1 | 1 | 3 | 3 | — | — | — | 3 |
| 1010 1010 | 0 | 1 | 1 | 3 | 3 | — | — | — | 3 |
| 1010 1011 | I11 | 1 | 2 | 3 | 3 | — | — | — | 3 |
| 1010 1100 | 0 | 0 | I11 | 1 | 2 | 2,c | — | — | 2 |
| 1010 1101 | 1 | I11 | 2 | 3 | 3 | — | — | — | 3 |
| 1010 1110 | 0 | I11 | 2 | 3 | 3 | — | — | — | 3 |
| 1010 1111 | I11 | I11 | 2 | 3 | 3 | — | — | — | 3 |
| 1011 0000 | 0 | 0 | 0 | 0 | I11 | 1 | 1,c | — | 1 |
| 1011 0001 | 1 | 1 | 1 | I11 | 2 | 2,c | — | — | 2 |
| 1011 0010 | 0 | 1 | 1 | I11 | 2 | 2,c | — | — | 2 |
| 1011 0011 | I11 | 1 | 1 | I11 | 2 | 2,c | — | — | 2 |
| 1011 0100 | 0 | 0 | 1 | I11 | 2 | 2,c | — | — | 2 |
| 1011 0101 | 1 | 2 | I11 | 3 | 3 | — | — | — | 3 |
| 1011 0110 | 0 | I11 | 1 | I11 | 2 | 2,c | — | — | 2 |
| 1011 0111 | I11 | 2 | I11 | 3 | 3 | — | — | — | 3 |
| 1011 1000 | 0 | 0 | 0 | I11 | 2 | 2,c | — | — | 2 |
| 1011 1001 | 1 | 1 | I11 | 3 | 3 | — | — | — | 3 |
| 1011 1010 | 0 | 1 | I11 | 3 | 3 | — | — | — | 3 |
| 1011 1011 | I11 | 1 | I11 | 3 | 3 | — | — | — | 3 |
| 1011 1100 | 0 | 0 | I11 | I11 | 2 | 2,c | — | — | 2 |
| 1011 1101 | 1 | I11 | I11 | 3 | 3 | — | — | — | 3 |
| 1011 1110 | 0 | I11 | 2 | 3 | 3 | — | — | — | 3 |
| 1011 1111 | I11 | I11 | I11 | I11 | 3 | — | — | — | 3 |
| 1100 0000 | 0 | 0 | 0 | 0 | 0 | 0 | I11 | — | 1 |
| 1100 0001 | 1 | 1 | 1 | 1 | 1 | I11 | — | — | 2 |
| 1100 0010 | 0 | 1 | 1 | 1 | 1 | I11 | — | — | 2 |

TABLE 7-continued

| ADVANCEBUS VALUE | CUR SCU 0 VALUE | CUR SCU 1 VALUE | CUR SCU 2 VALUE | CUR SCU 3 VALUE | CUR SCU 4 VALUE | CUR SCU 5 VALUE | CUR SCU 6 VALUE | CUR SCU 7 VALUE | ROT VALUE |
|---|---|---|---|---|---|---|---|---|---|
| 1100 0011 | I11 | 1 | 1 | 1 | 1 | I11 | — | — | 2 |
| 1100 0100 | 0 | 0 | 1 | 1 | 1 | I11 | — | — | 2 |
| 1100 0101 | 1 | 2 | 2 | 2 | 3 | — | — | — | 3 |
| 1100 0110 | 0 | I11 | 1 | 1 | 1 | I11 | — | — | 2 |
| 1100 0111 | I11 | 2 | 2 | 2 | 3 | — | — | — | 3 |
| 1100 1000 | 0 | 0 | 0 | 1 | 1 | I11 | — | — | 2 |
| 1100 1001 | 1 | 1 | 1 | 2 | 3 | — | — | — | 3 |
| 1100 1010 | 0 | 1 | 1 | 2 | 3 | — | — | — | 3 |
| 1100 1011 | I11 | 1 | 2 | 2 | 3 | — | — | — | 3 |
| 1100 1100 | 0 | 0 | I11 | 1 | 1 | I11 | — | — | 2 |
| 1100 1101 | 1 | I11 | 2 | 2 | 3 | — | — | — | 3 |
| 1100 1110 | 0 | I11 | 2 | 2 | 3 | — | — | — | 3 |
| 1100 1111 | I11 | I11 | 2 | 2 | 3 | — | — | — | 3 |
| 1101 0000 | 0 | 0 | 0 | 0 | 1 | I11 | — | — | 2 |
| 1101 0001 | 1 | 1 | 1 | 2 | 3 | — | — | — | 3 |
| 1101 0010 | 0 | 1 | 1 | 2 | 3 | — | — | — | 3 |
| 1101 0011 | I11 | 1 | 1 | 2 | 3 | — | — | — | 3 |
| 1101 0100 | 0 | 0 | 1 | 2 | 3 | — | — | — | 3 |
| 1101 0101 | 1 | 2 | 3 | 3 | 3 | — | — | — | 3 |
| 1101 0110 | 0 | I11 | 1 | 2 | 3 | — | — | — | 3 |
| 1101 0111 | I11 | 2 | 3 | 4 | — | — | — | — | 4 |
| 1101 1000 | 0 | 0 | 0 | I11 | 1 | I11 | — | — | 2 |
| 1101 1001 | 1 | 1 | I11 | 2 | 3 | — | — | — | 3 |
| 1101 1010 | 0 | 1 | I11 | 2 | 3 | — | — | — | 3 |
| 1101 1011 | I11 | 1 | I11 | 2 | 3 | — | — | — | 3 |
| 1101 1100 | 0 | 0 | I11 | 2 | 3 | — | — | — | 3 |
| 1101 1101 | 1 | I11 | 3 | 4 | — | — | — | — | 4 |
| 1101 1110 | 0 | I11 | I11 | 2 | 3 | — | — | — | 3 |
| 1101 1111 | I11 | I11 | 3 | I11 | — | — | — | — | 4 |
| 1110 0000 | 0 | 0 | 0 | 0 | 0 | I11 | 1,c | — | 1 |
| 1110 0001 | 1 | 1 | 1 | 1 | I11 | 2,c | — | — | 2 |
| 1110 0010 | 0 | 1 | 1 | 1 | I11 | 2,c | — | — | 2 |
| 1110 0011 | I11 | 1 | 1 | 1 | I11 | 2,c | — | — | 2 |
| 1110 0100 | 0 | 0 | 1 | 1 | Ilegal | 2,c | — | — | 2 |
| 1110 0101 | 1 | 2 | 2 | I11 | 3 | — | — | — | 3 |
| 1110 0110 | 0 | I11 | 1 | 1 | I11 | 2,c | — | — | 2 |
| 1110 0111 | I11 | 2 | 2 | I11 | 3 | — | — | — | 3 |
| 1110 1000 | 0 | 0 | 0 | 1 | I11 | 2,c | — | — | 2 |
| 1110 1001 | 1 | 1 | 1 | I11 | 3 | — | — | — | 3 |
| 1110 1010 | 0 | 1 | 1 | I11 | 3 | — | — | — | 3 |
| 1110 1011 | I11 | 1 | 2 | I11 | 3 | — | — | — | 3 |
| 1110 1100 | 0 | 0 | I11 | 1 | I11 | 2,c | — | — | 2 |
| 1110 1101 | 1 | I11 | 2 | I11 | 3 | — | — | — | 3 |
| 1110 1110 | 0 | I11 | 2 | I11 | 3 | — | — | — | 3 |
| 1110 1111 | I11 | I11 | 2 | I11 | 3 | — | — | — | 3 |
| 1111 0000 | 0 | 0 | 0 | 0 | I11 | I11 | — | — | 2 |
| 1111 0001 | 1 | 1 | 1 | I11 | I11 | — | — | — | 3 |
| 1111 0010 | 0 | 1 | 1 | I11 | 3 | — | — | — | 3 |
| 1111 0011 | I11 | 1 | 1 | I11 | 3 | — | — | — | 3 |
| 1111 0100 | 0 | 0 | 1 | I11 | 3 | — | — | — | 3 |
| 1111 0101 | 1 | 2 | I11 | I11 | 3 | — | — | — | 3 |
| 1111 0110 | 0 | I11 | 1 | I11 | 3 | — | — | — | 3 |
| 1111 0111 | I11 | 2 | I11 | I11 | 3 | — | — | — | 3 |
| 1111 1000 | 0 | 0 | 0 | I11 | I11 | 2,c | — | — | 2 |
| 1111 1001 | 1 | 1 | I11 | I11 | 3 | — | — | — | 3 |
| 1111 1010 | 0 | 1 | I11 | I11 | 3 | — | — | — | 3 |
| 1111 1011 | I11 | 1 | I11 | I11 | 3 | — | — | — | 3 |
| 1111 1100 | 0 | 0 | I11 | I11 | 3 | — | — | — | 3 |
| 1111 1101 | 1 | I11 | I11 | I11 | 3 | — | — | — | 3 |
| 1111 1110 | 0 | I11 | 2 | I11 | 3 | — | — | — | 3 |
| 1111 1111 | I11 | I11 | I11 | I11 | I11 | — | — | — | 4 |

The concept of the invention thus is to use lower clock speeds, say of the order of 40 or 50 megahertz as an example, both to encode HDLC in the transmit direction and to decode in the receive direction for wires that carry data up to 10 gigabyte/sec speeds, and by scaling, even higher speeds, and to do this running with multiple byte streams at a time.

Further modifications will occur to those skilled in this art and such are considered to fall within the spirit and scope of the invention as defined in the appended claims.

What is claimed is:

1. A method of inserting characters in data packets and datagrams therefor on high speed data stream networking links for clocked HDLC data processing, that comprises, interposing a multilane highway matrix of input data and escape character busses between a plurality of input and corresponding output FIFOs; respectively inputting groups of FIFO serial data parallely to successive input data busses of the highway matrix and outputting corresponding groups of FIFO data from the input busses through corresponding output FIFO selectors; comparing data taken from the busses with one of interframe flag, escape, and preprogrammed stored a synchronous-control character map characters, accordingly logically to control the output FIFO selectors to append a suitable character between appropriate bytes in the data stream; and clocking the HDLC processing at a rate low compared with the said high speed of the data stream.

2. A method as claimed in claim 1 wherein each of said groups of input FIFO data is formed into an octet stream, and each such stream is independently controlled.

3. A method as claimed in claim 1 wherein the output FIFO selectors are operated to multiplex the multilane highway data and apply it on the corresponding output FIFOs.

4. A method as claimed in claim 3 wherein each output FIFO selector is controlled through a select compute unit that receives the result of said comparing.

5. A method as claimed in claim 4 wherein three computational results are performed in the select compute unit providing the current clock select value, the logic for the next clock select value, and the logic for the current clock output FIFO selectors select value.

6. A method as claimed in claim 5 wherein the output FIFO selector is controlled by the next clock select value from its corresponding select computer unit to cause rotation of the output FIFO selector counterclockwise by the total number of compares effected in the previous clock.

7. A method as claimed in claim 5 wherein the current clock select value and the previous number of compares are looked up in a table, and the output of the table and the current clock select value are subtracted to form said output FIFO selector value, causing such selectors to be rotated counterclockwise by the number of previous compares; or, if there is a comparison match, to select a constant value.

8. A method as claimed in claim 7 wherein said table is prepared from the value of the compares for all comparisons and the previous selector value of the previous clock cycle, thereby presenting table values for multiple selectors.

9. A method as claimed in claim 8 wherein, for selectors numbered 0,1,2,3,5 and 7, the tables are, respectively, Tables 0,1,2,3,5 and 6 of the specification herein.

10. A method as claimed in claim 1 wherein an end of packet indication is generated indicating when the packet has ended and on which byte boundary it has ended.

11. A method as claimed in claim 1 wherein the FIFO data streams with appropriate flag and escape characters inserted therein are transmitted and then received as a packet paralleled to n bytes wide, with HDLC functions being performed in a time domain of n times the byte time.

12. A method as claimed in claim 11 wherein the received n byte streams are fed to a plurality of input FIFOs and then parallely fed therefrom to corresponding further input data multilane highway matrix busses from which data is applied through a corresponding plurality of output FIFO selectors to corresponding output FIFOs.

13. A method as claimed in claim 12 wherein said escape characters inserted in the transmitted data stream are deleted in the output FIFOs and replaced with data.

14. A method as claimed in claim 13 wherein the trickling of the paralleled data streams from the input FIFOs and the multilane highway matrix busses is controlled by corresponding select compute units, and data is read from the highway matrix by clocking the input FIFOs controlled by the corresponding select compute units.

15. A method as claimed in claim 14 wherein a flag is sent to stop data when an input FIFO becomes full.

16. A method as claimed in claim 14 wherein the data from the multilane highway matrix is clocked into the output FIFOs via corresponding output FIFO selectors, and said selectors multiplex the multilane highway busses onto a single byte output FIFO, with the output FIFO selectors bring passive and controlled by the corresponding select compute units.

17. A method as claimed in claim 16 wherein asynchronous-control character map control selectors are provided and are connected parally to receive data from the multilane highway busses and to output through corresponding compare units, with the control selector multiplexing the multilane highway busses onto a single compare unit, and with the compare units being passive and controlled by the corresponding select compute units.

18. A method as claimed in claim 17 wherein the compare units compare data from said control selectors with constant stored values including escape, flag packet delineator and control characters.

19. A method as claimed in claim 18 wherein, if the incoming data has such control character but without an appended escape character, the control characters are deleted from the outgoing stream.

20. A method as claimed in claim 1 wherein the clock rate is set at the order of tens of megahertz and the data rate in the gigabytes/second range.

21. A method of deleting characters in received data packets and datagrams therefor on high speed data stream networking links with clocked HDLC data processing, that comprises, receiving input FIFO groups of data streams with flag and escape characters inserted therein as packets paralleled to n bytes wide, with the HDLC functions being performed in a time domain of n times the byte time; feeding the received n byte streams to a plurality of input FIFOs and then parallely fed therefrom to corresponding further input data multilane highway matrix busses from which data is applied through a corresponding plurality of output FIFO selectors to corresponding output FIFOs wherein said escape characters received in the data stream are deleted in the output FIFOs and replaced with data.

22. A method as claimed in claim 21 wherein the trickling of the paralleled data streams from the input FIFOs and the multilane highway matrix busses is controlled by corresponding select compute units, and data is read from the highway matrix by clocking the input FIFOs controlled by the corresponding select compute units.

23. A method as claimed in claim 22 wherein a flag is sent to stop data when an input FIFO becomes full.

24. A method as claimed in claim 22 wherein the data from the multilane highway matrix is clocked into the output FIFOs via corresponding output FIFO selectors, and said selectors multiplex the multilane highway busses onto a single byte output FIFO, with the output FIFO selectors bring passive and controlled by the corresponding select compute units.

25. A method as claimed in claim 24 wherein asynchronous-control character map control selectors are provided and are connected parally to receive data from the multilane highway busses and to output through corresponding compare units, with the control selector multiplexing the multilane highway busses onto a single compare unit, and with the compare units being passive and controlled by the corresponding select compute units.

26. A method as claimed in claim 25 wherein the compare units compare data from said ACCM control selectors with constant stored values including escape, flag packet delineator and control characters.

27. A method as claimed in claim 26 wherein, if the incoming data has such control characters but without an appended escape character the control characters are deleted from the outcoming stream.

28. Apparatus for inserting characters in data packets and datagrams therefor on high speed data stream networking links for clocked HDLC data processing, having, in combination, a multilane highway matrix of input data and escape character busses inserted between a plurality of input and corresponding output FIFOs; means for respectively inputting groups of FIFO serial data parallely to successive input data busses of the highway matrix, outputting corresponding groups of FIFO data from the input busses through corresponding output FIFO selectors, comparing data taken from the busses with one of interframe flag, escape, and preprogrammed stored asychronous-control character map characters accordingly logically to control the output FIFO selectors to append a suitable character between appropriate bytes in the data stream; and operating the HDLC processing at a rate low compared with the said high speed of the data stream.

29. Apparatus as claimed in claim 28 wherein each of said groups of input FIFO data is formed into an octet stream, and each such stream is independently controlled.

30. Apparatus as claimed in claim 28 wherein the output FIFO selectors are operated to multiplex the multilane highway data and apply it on the corresponding output FIFOs.

31. Apparatus as claimed in claim 30 wherein means is provided for controlling each output FIFO selector through a select compute unit that receives the result of the said comparing.

32. Apparatus as claimed in claim 31 wherein the select compute unit performs three computational results providing the current clock select value, the logic for the next clock select value, and the logic for the current clock output FIFO selectors select value.

33. Apparatus as claimed in claim 32 wherein means is provided for controlling the output FIFO selector by the next clock select value from its corresponding select computer unit to cause rotation of the output FIFO selector counterclockwise by the total number of compares effected in the previous clock.

34. Apparatus as claimed in claim 32 wherein the current clock select value and the previous number of compares are looked up in a table, and means is provided for subtracting the output of the table and the current clock select value to form said output FIFO selector value, causing such selectors to be rotated counterclockwise by the number of previous compares; or, if there is a comparison match, to select an ACCM constant.

35. Apparatus as claimed in claim 34 wherein said table is prepared from the value of the compares for all comparisons and the previous selector value of the previous clock cycle, thereby presenting table values for multiple selectors.

36. Apparatus as claimed in claim 28 where means is provided for generating an end of packet indication indicating when the packet has ended and on which byte boundary it has ended.

37. Apparatus as claimed in claim 28 wherein means is provided for receiving the output FIFO data streams with appropriate flag and escape characters inserted therein as a packet paralleled to n bytes wide, with the HDLC functions being performed in a time domain of n times the byte time; and wherein means is provided for feeding the received n byte streams to a plurality of input FIFOs and then parallely fed therefrom to corresponding further input data multilane highway matrix busses from which data is applied through a corresponding plurality of output FIFO selectors to corresponding output FIFOs; and means for deleting said escape characters inserted in the transmitted data stream in the output FIFOs and for replacing the same with data.

38. Apparatus as claimed in claim 37 wherein the trickling at the receiving means of the paralleled received data streams from the input FIFOs and the further multilane highway matrix busses is controlled by corresponding select compute units, and means is provided for reading data from the highway matrix by clocking the input FIFOs controlled by the corresponding select compute units.

39. Apparatus as claimed in claim 38 wherein means is provided for sending a flag to stop data when an input FIFO becomes full.

40. Apparatus as claimed in claim 38 wherein the data from the multilane highway matrix is clocked into the output FIFOs via corresponding output FIFO selectors, and said selectors multiplex the multilanehighway busses onto a single byte output FIFO, with the output FIFO selectors being passive and controlled by the corresponding select compute units.

41. Apparatus as claimed in claim 38 wherein control selectors are provided and are connected parallely to receive data from the multilane highway busses and to output through corresponding compare units, with the control selector multiplexing the multilane highway busses onto a single compare unit, with the compare units being passive and controlled by the corresponding select compute units.

42. Apparatus as claimed in claim 17 wherein the compare units compare data from said control selectors with constant stored values including escape, flag packet delineator and control characters.

43. Apparatus as claimed in claim 42 wherein if the incoming data has such control characters but without an appended escape character, means is provided for deleting the control characters from the outgoing stream.

44. Apparatus as claimed in claim 28 wherein the clock rate is set at the order of tens of megahertz and the data rate in the gigabytes/second range.

* * * * *